United States Patent [19]

Inoue

[11] Patent Number: 4,653,216
[45] Date of Patent: Mar. 31, 1987

[54] TUBE FOR FISHING ROD

[75] Inventor: Koi Inoue, Koganei, Japan

[73] Assignee: Daiwa Seiko Inc., Tokyo, Japan

[21] Appl. No.: 721,286

[22] Filed: Apr. 9, 1985

[30] Foreign Application Priority Data

Apr. 13, 1984 [JP] Japan .................. 59-54540[U]
Apr. 13, 1984 [JP] Japan .................. 59-54541[U]
Apr. 23, 1984 [JP] Japan .................. 59-59452[U]
Jun. 15, 1984 [JP] Japan .................. 59-89210[U]

[51] Int. Cl.⁴ .............................................. A01K 87/00
[52] U.S. Cl. .............................................. 43/18.5
[58] Field of Search ............... 43/18.5, 18.1; 156/190, 156/191

[56] References Cited

U.S. PATENT DOCUMENTS 1,318,421 10/1919 Welles ........................... 43/18.1
3,186,122  6/1965 Clock ............................ 43/18.5

FOREIGN PATENT DOCUMENTS 131413 6/1947 Australia ........................ 43/18.1

Primary Examiner—Gene P. Crosby
Attorney, Agent, or Firm—Kalish & Gilster

[57] ABSTRACT

A fishing rod comprising a tube formed of a high strength fiber sheet fabricated from the class consisting of glass fibers, carbon fibers, and amide fibers; the sheet being impregnated with a synthetic resin. A reinforcement layer of high strength fibers is disposed about the rod; the layer comprising a plurality of parallel spaced bundles extending substantially from one end to the other end of the rod in a twill configuration.

41 Claims, 11 Drawing Figures

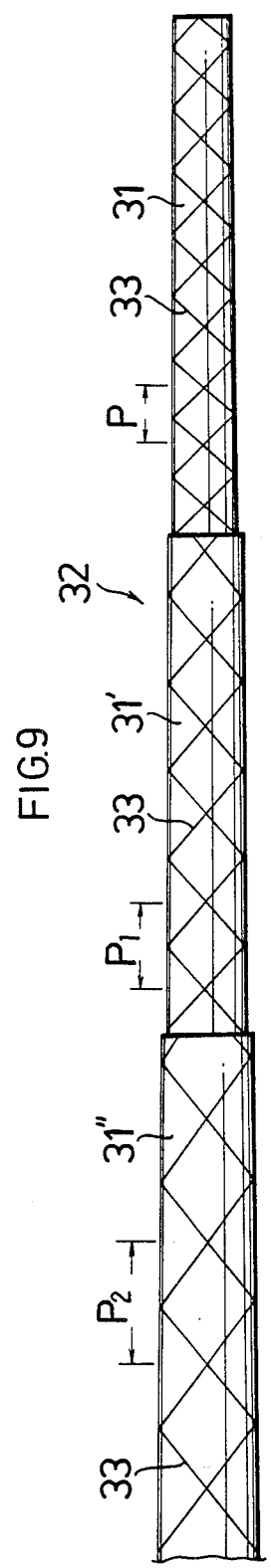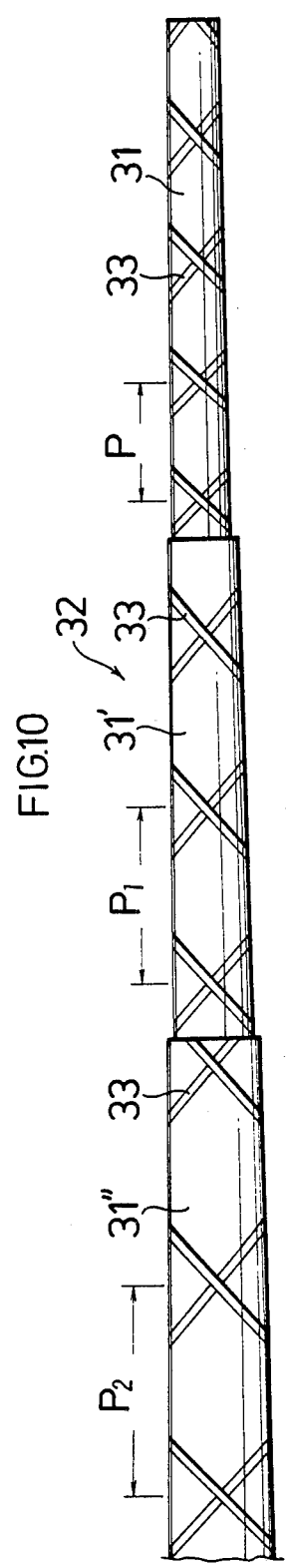

TUBE FOR FISHING ROD

BACKGROUND AND SUMMARY OF THE INVENTION

The present invention relates to an improvement in a tube for a fishing rod, having a hollow tubular member constituted of a high-strength fiber sheet such as of glass fibers, carbon fibers or amide fibers, impregnated with a synthetic resin, and a reinforcement layer of high-strength fibers wound round the hollow tubular member.

It is well known that stiffness, strength and weight, which are critical factors in fishing rods, can be controlled by using a synthetic resin reinforced with high-strength fibers such as glass fibers, carbon fibers and amide fibers as the rod material. The term "stiffness" is used here to mean characteristics such as flexural rigidity, rebounding characteristics, bending curve and so forth, while the term "strength" includes the concepts of bending strength, collapse strength and twisting strength. The weight is determined secondarily when the stiffness and the strength are satisfied by the properties of the material.

Glass fibers provide only a low resistance because such possess comparatively small strength for the weight thereof. Therefore, for obtaining high strength, the amount of material used must be increased resulting in an impractically heavy fishing rod.

For carbon fiber, the fiber bundles are arrayed in one direction to form a sheet which is lined with a thin glass woven fabric or, alternatively, woven fabric is formed by using carbon fibers as the warp and glass fibers as the weft.

When the carbon fibers are used as the warp, the rod exhibits a superior resistance to deformation along the axis because this material exhibits greater strength and resiliency than glass fibers. However, the rod has little collapse strength in the circumferential (weft) direction because the weft is constituted of glass fibers. In consequence, the rod often cracks in the longitudinal direction due to breakdown of the glass fibers constituting the weft. Similarly, the rod tends to crack by a twisting force. The cracking, needless to say, leads to breakage of the rod.

In the case of a woven fabric in which both the warp and weft are constituted of carbon fibers, the problems of longitudinal cracking and rod breakdown are avoided due to the strength against bending and circumferential compression strength. In this case, however, the carbon fibers constituting the weft exhibit excessive springing force so as to make it difficult to wind the woven fabric around a thin core metal, resulting in material which is hard to work with and a component of inferior quality.

The strength has to be selected in view of a variety of rod diameters and, hence, has to be varied according to the sections and portions of sections of the rod. To meet such a demand, the amount of the weft of specific portions of the woven fabric has to be controlled precisely during the continuous formation of the woven fabric. Such control is technically extremely difficult to effect and involves various problems in the production process.

Japanese Utility Model Publication No. 49105/1983 discloses a known fishing rod which is improved so as to obviate the above-described problems derived from the use of glass and carbon reinforcement fibers.

This known fishing rod has a core made of a preimpregnated sheet reinforced with high-strength fibers and a tape made of bundles of filaments of high-strength fibers wound around the core coarsely at a pitch which is greater than the tape width. In this fishing rod, therefore, the region around which the tape is wound and the region around which the tape is not wound exhibit completely different levels of strength against bending force. In addition, the tape wound round the core serves as a hoop so that stress is liable to be concentrated in the region on the boundary between the edges of the hoop and the portion of the core between adjacent turns of the tape, increasing the possibility of breakdown of the rod. Considering that fishing rods are usually flexed greatly in practice, this known fishing rod is not preferred because the stress is concentrated locally, particularly when the flexure is large resulting in a great possibility of breakdown of the rod, although a considerable reinforcement effect is produced when the flexture is still slight.

OBJECTS OF THE INVENTION

Accordingly, an object of the invention is to provide a fishing rod in which the undesirable stress concentration in the region on the boundary between the regions reinforced by the tape and the regions which are not reinforced by the tape is avoided to prevent the breakdown of the rod, regardless of whether the flexure is large or small, thereby overcoming the above-described problems of the prior art.

Another object of the invention is to provide a tube for a fishing rod which exhibits a natural vlexture within a vertical plane, without exhibiting any torsion of the tubular member.

Still another object of the invention is to provide a tube for fishing rod in which collapse strength capable of withstanding rod deflection which corresponds to the diameter of each cross-section of the rod is enhanced such as to attain a uniform reinforcing effect along the length of the tube thus attaining a sufficiently high strength of the fishing rod.

BRIEF DESCRIPTION OF THE DRAWINGS

FIG. 9 is a front elevational view of a fifth embodiment of the invention; and

FIG. 10 is a front elevational view of a sixth embodiment of the invention.

DESCRIPTION OF PRACTICAL EMBODIMENTS

Embodiments of the invention will be described hereinunder with reference to the accompanying drawings.

Figure 1:
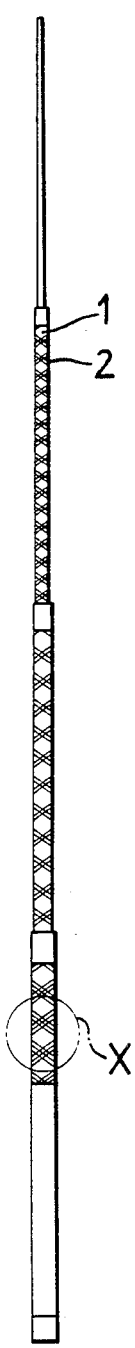
FIG. 1 is a front elevational view of an embodiment of the invention.
Figure 2:
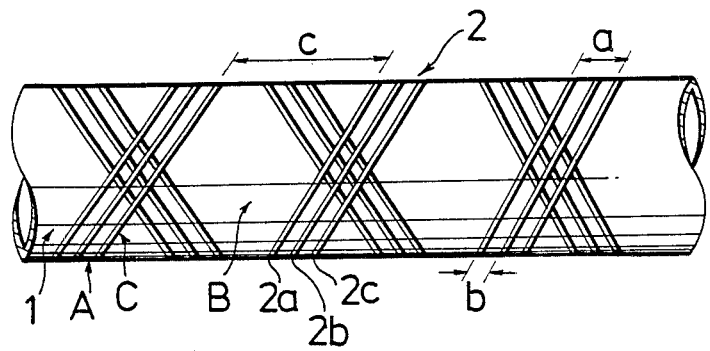
FIG. 2 is an enlarged view of a portion marked at X in FIG. 1.

FIG. 1 shows a first embodiment in which a reinforcement belt 2 is wound in a twill configuration on a hollow tubular member 1. The outer peripheral surface of this structure is taped as known per se and thermal set by a heat-treatment. Then, the tape is removed leaving the reinforcement belt 2 integrated with the hollow tubular member 1.

The hollow tubular member 1 is formed by a process having the steps of forming a sheet made of high-strength fibers such as glass fibers, carbon fibers or amide fibers, impregnating the sheet with a thermosetting resin such as a phenol resin, polyester resin or epoxy resin such as to form a fiber-reinforced half-dry sheet, and winding the said sheet on the mandrel.

The reinforcement band is constituted by a plurality of (three in the illustrated case) bundles of high-strength fibers 2a, 2b and 2c arranged in parallel at a desired pitch or interval b. The reinforcement belt 2 is wound in a twill configuration around the hollow tubular member 1 substantially from one to the other end thereof, at a pitch c which is greater than the width a of the band. Each of the bundles 2a, 2b and 2c of the high-strength fibers constituting the reinforcement belt 2 has 100 to 10000 pieces of high-strength fibers such as glass fibers, carbon fibers and amide fibers each having a diameter of 6 to 15 $\mu$. The interval b between the bundles 2a, 2b and 2c of the reinforcement belt 2 ranges between 1 and 10 mm. The number of the high-strength fiber bundles constituting the reinforcement belt 2 ranges between 2 and 5.

As to the bundle of the high-strength fibers, it is necessary that the amount of the fibers is controlled to meet the degree of reinforcement demanded for attaining the reinforcement in the weft direction corresponding to the high bending strength attained by the warp fibers.

The control of the amount of reinforcement fibers can be achieved by suitably selecting the size of the fibers, number of the fibers and pitch of winding of the belt. In fact, however, the fiber bundle has to have a size which ensures a tensile strength large enough to withstand the tension which is applied to the bundle during the winding in order to attain a tight winding of the bundles on the tubular member.

When fiber bundles of a diameter large enough to withstand the tension are wound finely, the reinforcement effect produced by such bundles becomes excessively large. Note also that a unidirectional spiral winding of the fibers provides an unbalanced rod which exhibits only slight torsional strength against the twisting load acting in the direction opposite to the winding direction.

According to the invention, the circumferential reinforcement fibers of an amount required for the reinforcement of a unit length of the rod are not formed into a single bundle but are grouped into 2 to 5 bundles of a suitable size, and these bundles as a group are wound round the tubular member. According to this arrangement, the stress is distributed to many regions constituting the boundary between the reinforced portions and non-reinforced portions of the tubular member. In addition, since the belt constituted by the fiber bundles is wound in a twill configuration, the rod having the described construction can well resist the twisting load in both directions.

Thus, the tube of this embodiment has a reinforcement belt 2 which is constituted by a plurality of bundles 2a, 2b and 2c of high-strength fibers which are arranged in parallel with a predetermined interval. Therefore, the number of the high-strength fibers in each fiber bundle is few as compared with the conventional case in which the reinforcement belt is constituted by a single integral fiber bundle. According to this arrangement, it is possible to suppress the tendency of stress concentration to the regions C between the portions A around which the reinforcement belt 2 is wound and the positions B around which the reinforcement belt 2 is not wound. In addition, distribution of stress is attained also in each turn of the reinforcement belt 2 having the predetermined width a.

Therefore, a fishing rod incorporating this tube not only has a high reinforcement effect in the region of slight flexure but also possesses a superior stress distribution effect even in the region of high flexure of the fishing rod, thus ensuring strong resistance to rupture.

The amide fibers, when used as the high-strength fibers of the fiber bundles constituting the reinforcement belt 2, exhibit better stress distribution than glass fibers or carbon fibers are used. In addition, the bundles of the high-strength fibers constituting the reinforcement belt need not always be arranged at a regular pitch but may be arranged at an irregular pitch. The bundles of high-strength fibers constituting the reinforcement belt 2 need not always be of equal diameter. Namely, the reinforcement belt 2 may be constituted of fiber bundles of different diameters. The alteration of the arrangement and size of the fiber bundles in the reinforcement belt 2 provides better stress distribution. Although in the described embodiment the reinforcement belt 2 is not impregnated with a thermosetting resin, the invention does not exclude impregnation of the belt 2 with a thermosetting resin, and whether the impregnation is made or not is a matter of choice.

As has been described, according to the first embodiment of the invention, concentration of stress in the regions on the boundary between the portion on which the reinforcement belt is wound and the portion on which the reinforcement belt is not wound can be avoided to prevent rupture of the fishing rod.

Figure 3:
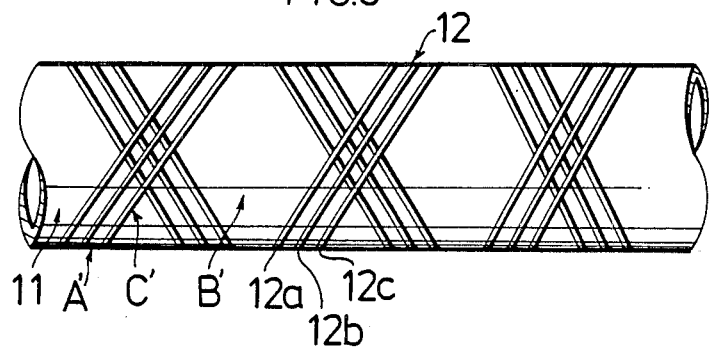
FIG. 3 is an enlarged view of a second embodiment of the invention.

FIG. 3 shows a second embodiment of the invention which has a hollow tubular member 11 and a reinforcement belt 12 constituted by a plurality of parallel spaced high-strength fiber bundles of different strengths, the reinforcement belt 12 being wound on the tubular member 11 substantially from one to the other end at a desired interval in a twill configuration and thermally set and integrated with the tubular member by a known technique.

The hollow tubular member 11 is the same one as that used in the first embodiment and, therefore, the detailed description thereof has been omitted.

Figure 4A:
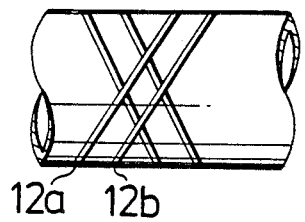
FIGS. 4a and 4b are partial illustrations of an array of bundles of high-strength fibers used in a second embodiment of the invention.
Figure 4B:
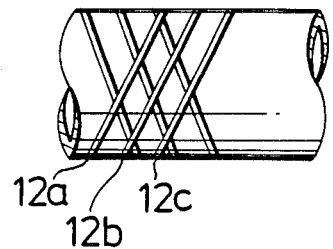

The reinforcement belt 12 is constituted by a plurality of high-strength fiber bundles made of fibers having different strengths, such as glass fiber, carbon fibers and amide fibers. For example, in the arrangement shown in FIG. 4(a), two bundles 12a and 12b of high-strength fibers, e.g., a bundle of carbon fibers and a bundle of amide fibers or, alternatively, a bundle of glass fibers and a bundle of carbon fibers, are used. In another example shown in FIG. 4(b), three bundles 12a, 12b and 12c, e.g., an amide fiber bundle, a glass fiber bundle and a carbon fiber bundle or, alternatively, an amide fiber bundle and a glass fibuer bundle and another amide fiber bundle, are used. The high-strength fiber bundles 12a, 12b and 12c are arranged substantially in parallel at a desired interval around the hollow tubular member 10 substantially from one end to the other thereof in twill configuration. Each of the high-strength fiber bundles 12a, 12b and 12c constituting the reinforcement belt 12 consists of 100 to 10000 pieces of fibers having a diameter of 6 to 15 $\mu$. The interval between adjacent bundles preferably ranges between 1 and 10 mm. In order to enjoy an appreciable reinforcement effect, the number of the bundles constituting the reinforcement belt is 2 to 5, although it depends on the object of the use. An appreciable reinforcement effect is obtained when the pitch of winding of the reinforcement belt 2 is at least equal to the width of the same.

As has been described, the tube of this embodiment is provided with a plurality of high-strength fiber bundles 12a, 12b and 12c having different strengths and arranged at a suitable intervals in parallel with one another. Therefore, when the flexure of the rod is slight, the bundle of high-strength fibers having comparatively little strength bears the load, whereas, when the flexure is large, the high-strength fiber bundle having a large strength bears the load, so that the load applied to the rod is progressively borne by respective high-strength fiber bundles such as to avoid any stress concentration in the region on the boundary between the portions where the reinforcement belt is wound and the portions where the reinforcement belt is not wound. It will be seen that, in the tube of this embodiment, the number of filaments of fibers in each high-strength fiber bundle is few compared with the conventional case in which the reinforcement belt is constituted by a single integral fiber bundle.

Bending of a fishing rod is transferred from the distal end to the proximal end of the rod. This means that the reinforcement belt has to exhibit considerable reflection, i.e., a large change in the cross-sectional area, at the distal end of the rod. Therefore, it is preferred not only to construct the reinforcement belt by a plurality of separate high-strength fiber bundles so as to distribute the stress, but also to construct the rod such as to progressively relax the stress from the distal end towards the proximal end of the fishing rod. To this end, it is advisable to use extremely long amide fibers as the reinforcement material for the distal rod end, while using carbon fibers having high-strength as the reinforcement material for the proximal end of the rod. By such an arrangement, it is possible to efficiently reinforce the rod and the object of the invention can be achieved by minimal use of the fibers. The reinforcement belt may or may not be impregnated with a thermosetting resin. Whether the impregnation is to be made or not is a matter of choice.

As has been described, according to the invention, it is possible to progressively relax the stress by the use of a plurality of high-strength fiber bundles of different strengths constituting the reinforcement belt, so that the stress concentration to the regions on the boundaries between portions where the reinforcement belt is wound and the portions where the reinforcement belt is not wound is avoided thus effectively preventing the rupture of the fishing rod.

Figure 5:
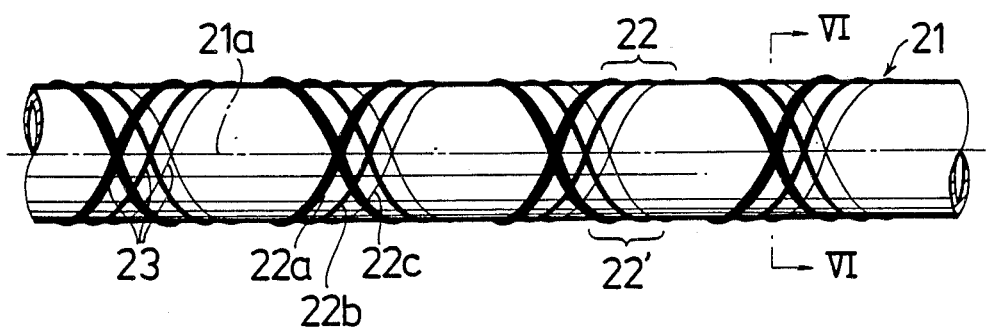
FIG. 5 is an enlarged view of a third embodiment of the invention.

FIG. 5 shows a third embodiment of the invention applied to a fishing rod. This fishing rod has a hollow tubular member 21 on which are wound a pair of reinforcement belts 22, 22' in a crossing manner. The pair of reinforcement belts 22 and 22' are arranged such that the line interconnecting the crossing points 23 extends parallel to the axis 21a of the hollow tubular member 21, and that the crossing points 23 are disposed in a common cross-section perpendicular to the axis 21a of the hollow tubular member 21. The hollow tubular member 21 and the reinforcement belts 22, 22' are integrated by a known thermosetting technique.

The hollow tubular member 21 used in this embodiment is the same one as that used in the first embodiment and, therefore, detailed description thereof is omitted.

As will be seen from FIG. 5, each of the pair of reinforcement belts 22 and 22' has at least one (three in the illustrated case) bundle 22a, 22b or 22c of high-strength fibers. The bundles being arranged in parallel at a suitable interval. The bundles of the reinforcement belt 22 are wound in the direction opposite to the direction of winding of the bundles of the reinforcement belt 22'. Each of the reinforcement belt 22, 22' is wound around the hollow tubular member 21 at a pitch which is greater than the width of the belt constituted by the high-strength fiber bundles 22a, 22b, 22c substantially from one to the other end of the tubular member 21 in a twill configuration. Each of a plurality of high-strength fiber bundles 22a, 22b and 22c constituting the reinforcement belts 22, 22' is composed of 100 to 10000 pieces of high-strength fibers such as glass fibers, carbon fibers and amide fibers having a fiber diameter of 6 to 15. The interval of the high-strength fiber bundles 22a, 22b and 22c preferably ranges between 1 and 10 mm, while the number of the high-strength fiber bundles constituting each reinforcement belt 22, 22' is preferably 1 to 5.

As explained already, the reinforcement belts 22 and 22' are wound in a cross or a twill configuration such that the points 23 of intersection when viewed in the longitudinal direction are disposed on a line extending parallel to the axis 21a of the hollow tubular member 21 and such that the points 23 of intersection as viewed in the circumferential direction are on a common cross-sectional plane normal to the axis 21a of the hollow tubular member 21.

Figure 6:
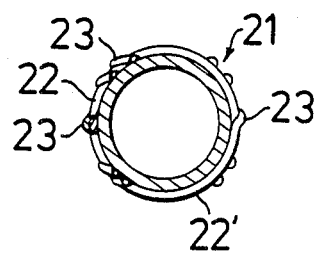
FIG. 6 is a sectional view taken along the line VI—VI of FIG. 5.
Figure 7:
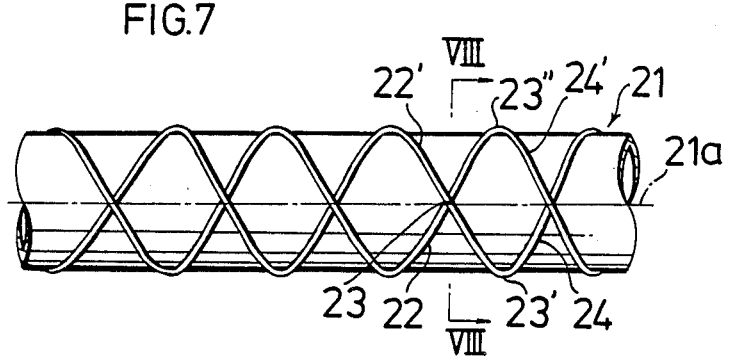
FIG. 7 is a side elevational view of a fourth embodiment of the invention.

Thus, in the tube of this embodiment, a pair of reinforcement belts 22, 22' are arranged in a cross or twill configuration such that the points 23 of intersection as viewed in the longitudinal direction are disposed on a line parallel to the axis 21a of the hollow tubular member 21 and such that the points of intersection 23 as viewed in the circumferential direction are disposed in a common cross-sectional area perpendicular to the axis 21a of the hollow tubular member 21. Therefore, the undesirable twisting of the points of intersection 23 on the outer peripheral surface as shown in FIG. 6 is avoided and the positions of these points 23 are stabilized. Therefore, the tube exhibits an identical cross-sectional shape at any portion along the length thereof, as well as a constant pattern of the reinforcement belts 22, 22'. Consequently, when the fishing rod is deflected, a natural deflection within a vertical plane is obtained without causing any torsion. The possibility of torsion is materially eliminated when there are alot of points of intersection 23.

Although a pair of reinforcement belts 22, 22' are used in the described embodiment, this is not exclusive and the tube of this embodiment can employ two pairs of reinforcement belts 22, 22', 24, 24' as shown in FIG.

Figure 8:
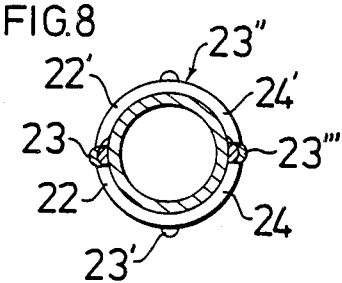
FIG. 8 is a vertical sectional view taken along the line VIII—VIII of FIG. 7.

7. In this case, as shown in FIG. 8, two intersections 23, 23', 23", 23"' are presented on a common cross-section. Needless to say, this embodiment can employ any desired number of pairs of reinforcement belts. This embodiment may be modified such that the bundles constituting each reinforcement belt is made of different high-strength fibers or the bundles of a belt have different sizes. The reinforcement belt may or may not be impregnated with a thermosetting resin. This is a matter of choice.

As has been described, according to the invention, the points of intersection are regularly arranged on the outer circumference of the reinforcement belt, so that a constant reinforcement force is obtained over the entire portion, thus preventing any torsion during the bending of the rod tube, thereby realizing a natural deflection of the rod.

FIG. 9 shows a third embodiment of the invention in which a fishing rod 32 is constituted by coupling three pieces 31, 31', 31" of rod tube. Each piece of rod tube is formed of high-strength fibers such as carbon fibers, glass fibers and so forth impregnated with a thermosetting resin. A reinforcement belt 33 made of high-strength fibers such as carbon fibers, glass fibers, amide fibers or the like, impregnated with a thermosetting resin, is wound on the outer peripheral surface of the piece of the rod tube, in a twill configuration. The pitch of winding of the reinforcement belt 33 is changed in accordance with the rod tube diameter, such that the pitch represented by P is the smallest on the distal rod tube piece 31 and the pitch P1 on the intermediate rod tube piece 31' is greater than the pitch P but is smaller than the pitch P2 on the rod tube piece 31" having the greatest diameter. Thus, the winding pitch is progressively increased from the distal end to the proximal end of the fishing rod.

In the described embodiment, the winding pitch of the reinforcement belt 33 is maintained constant in each rod tube piece, and the winding pitch is changed between the rod tube piece such that the pitch is smallest on the distal rod tube piece and greatest on the proximal end rod tube piece. This, however, is not exclusive and the winding pitch may be varied progressively in each of the rod tube pieces 31, 31', 31" such that the pitch is gradually decreased from the large-diameter region to the small-diameter region. In the case where the fishing rod is constituted by a single tapered tube rather than a plurality of rod tube pieces, the winding pitch is progressively changed such that the pitch is gradually decreased from the proximal end to the distal end of the rod.

Although in the illustrated embodiment a single reinforcement belt 33 is used, this is not exclusive and the described embodiment may be modified such that two parallel reinforcement belts are wound at a predetermined interval as shown in FIG. 10. It is also possible to reduce the number, diameter and the width of the belts in accordance with a reduction in the winding pitch.

The tube of this embodiment can be produced by integrating the reinforcement belt 33 with the tubular member by a process having the steps of preparing a prepreg impregnated with a thermosetting resin, winding the prepreg on a mandrel, winding the belt impregnated with a thermosetting resin on the tubular member, and thermally setting the resins by a known method.

Each of the rod tube pieces 31, 31', 31" is of the same type as the hollow tubular member 1 used in the first embodiment so that detailed description thereof is omitted.

The reinforcement belt may or may not be impregnated with a thermosetting resin. Whether such impregnation is made is a matter of choice.

As has been described, in this embodiment, a reinforcement belt is wound on a tubular member formed of high-strength fibers impregnated with a synthetic resin, wherein the pitch of winding of the reinforcement belt is changed such that the pitch is small on the portion of the tubular member having small diameter and is large on the portion of the same having a large diameter. With this arrangement, it is possible to obtain a collapse strength which is proportional to and able to withstand the deflection of the tubular member corresponding to the diameter of the tubular member, so that a uniform reinforcement effect is achieved along the length of the tubular member, thereby stiffening and reinforcing a tube for a fishing rod.

What is claimed is:

1. A tube for a fishing rod comprising: a hollow tubular member formed of a high-strength fiber sheet impregnated with a synthetic resin; and a reinforcement belt having a plurality of parallel spaced bundles of high-strength fibers, each of said bundles being constituted by 100 to 10,000 pieces of high-strength fibers of a fiber diameter ranging between 6 and 15 $\mu$, and reinforcement belt being disposed about said tubular member substantially from one end to the other end thereof in a twill configuration and being integrally set on said tubular member.

2. A tube for a fishing rod according to claim 1 wherein said reinforcement belt is spirally disposed at a pitch which is not less than the width of said belt.

3. A tube for a fishing rod according to claim 1 wherein said bundles of high-strength fibers have different strengths.

4. A tube for a fishing rod according to claim 3 wherein said reinforcement belt is spirally disposed at a pitch which is not less than the width of said belt.

5. A tube for a fishing rod according to claim 1 wherein said high-strength fibers are made of glass fibers.

6. A tube for a fishing rod according to claim 1 wherein said high-strength fibers are made of carbon fibers.

7. A tube for a fishing rod according to claim 1 wherein said high-strength fibers are made of amide fibers.

8. A tube for a fishing rod according to claim 1 wherein the distance between adjacent high-strength fiber bundles is 1 to 10 mm.

9. A tube for a fishing rod according to claim 1 wherein said reinforcement belt has 2 to 5 bundles.

10. A tube for a fishing rod according to claim 1 wherein the high-strength fiber bundles constituting said reinforcement belt have different widths.

11. A tube for a fishing rod according to claim 1 wherein said high-strength fiber bundles constituting said reinforcement belt have different diameters of high-strength fibers.

12. A tube for a fishing rod according to claim 1 wherein said high-strength fiber bundles are made of the same kind of high-strength bundles but have different quantities of high-strength fibers.

13. A tube for a fishing rod comprising: a hollow tubular member formed of a high-strength fiber sheet impregnated with a synthetic resin; and at least a pair of reinforcement belts each made of a plurality of parallel spaced bundles of high-strength fibers spirally disposed and integrally set on said tubular member substantially from one end to the other end thereof in a cross twill configuration, such that the points of intersections of said belts as viewed in the longitudinal direction of said tubular member are arranged on a line extending in parallel with the axis of said hollow tubular member.

14. A tube for a fishing rod according to claim 13 wherein the distance between adjacent high-strength fiber bundles is 1 to 10 mm.

15. A tube for a fishing rod according to claim 13 wherein each said reinforcement belt has 2 to 5 bundles.

16. A tube for a fishing rod according to claim 13 wherein the high-strength fiber bundles constituting each said reinforcement belt have different widths.

17. A tube for a fishing rod according to claim 13 wherein said high-strength fiber bundles constituting each said reinforcement belt have different diameters of high-strength fibers.

18. A tube for a fishing rod according to claim 13 wherein said high-strength fiber bundles are made of the same kind of high-strength bundles but have different quantities of high-strength fibers.

19. A tube for a fishing rod according to claim 13 wherein said bundles of high-strength fibers have different strengths.

20. A tube for a fishing rod according to claim 13 wherein each of said bundles is constituted by 100 to 10,000 pieces of high-strength fibers of a fiber diameter ranging between 6 and 15 $\mu$.

21. A tube for a fishing rod according to claim 20 wherein each of said reinforcement belts is spirally disposed at a pitch which is not less than the width of the respective belt.

22. A tube for a fishing rod according to claim 20 wherein said bundles of high-strenght fibers have different strengths.

23. A tube for a fishing rod according to claim 20 wherein said high-strenght fibers are made of glass fibers.

24. A tube for a fishing rod according to claim 20 wherein said high-strength fibers are made of carbon fibers.

25. A tube for a fishing rod according to claim 20 wherein said high-strength fibers are made of amide fibers.

26. A tube for a fishing rod according to claim 20 wherein the distance between adjacent high-strength fiber bundles it 1–10 mm.

27. A tube for a fishing rod according to claim 26 wherein each of said reinforcement belts is spirally disposed at a pitch which is not less than the width of the respective belt.

28. A tube for a fishing rod according to claim 27 wherein each said reinforcement belt has 2 to 5 bundles.

29. A tube for a fishing rod according to claim 28 wherein the high-strength fiber bundles constituting each said reinforcement belt have different widths.

30. A tube for a fishing rod according to claim 20 wherein each said reinforcement belt has 2 to 5 bundles.

31. A tube for a fishing rod according to claim 20 wherein the high-strength fiber bundles constituting each said reinforcement belt have different widths.

32. A tube for a fishing rod according to claim 20 wherein said high-strength fiber bundles constituting each said reinforcement belt have different diameters of high-strength fibers.

33. A tube for a fishing rod according to claim 32 wherein each said reinforcement belt is spirally disposed at a pitch which is not less than the width of said belt, the distance between adjacent high-strength fiber bundles being 1 to 10 mm.

34. A tube for a fishing rod according to claim 20 wherein said high-strength fiber bundles are made of the same kind of high-strength bundles but have different quantities of high-strength fibers.

35. A tube for a fishing rod according to claim 34 wherein each said reinforcement belt is spirally disposed at a pitch which is not less than the width of said belt, the distance between adjacent high-strength fiber bundles being 1 to 10 mm.

36. A tube for a fishing rod according to claim 20 wherein said bundles of high-strength fibers having different strengths, the distance between adjacent high-strength fiber bundles being 1 to 10 mm, each of said reinforcement belts being spirally disposed at a pitch not less than the width of the respective belt.

37. A tube for a fishing rod according to claim 20, the distance between adjacent high-strength fiber bundles being 1 to 10 mm, and each said reinforcement belt having 2 to 5 bundles.

38. A tube for a fishing rod according to claim 20, the distance between adjacent high-strength fiber bundles being 1 to 10 mm, the high-strength fiber bundles constituting each said reinforcement belt having different widths.

39. A tube for a fishing rod according to claim 20 wherein the high-strength fiber bundles constituting each said reinfocement belt having different diameters of high-strength fibers, the distance between adjacent high-strength fiber bundles being 1 to 10 mm.

40. A tube for a fishing rod according to claim 20 wherein the distance betweeen adjacent high-strength fiber bundles is 1 to 10 mm, and said high-strength fiber bundles are made of the same kind of high-strength bundles but have different quantities of high-strength fibers.

41. A tube for a fishing rod according to claim 20 wherein said bundles of high-strength fibers have different strengths, and the distance between high-strength fiber bundles is 1 to 10 mm.

* * * * *